United States Patent
Bonczkowski et al.

(10) Patent No.: US 10,764,357 B1
(45) Date of Patent: Sep. 1, 2020

(54) COMPLIANCE-BASED APPLICATION DEPLOYMENT SYSTEM AND METHOD FOR A CLOUD COMPUTING ENVIRONMENT

(71) Applicant: VCE Company, LLC, Richardson, TX (US)

(72) Inventors: Joshua L. Bonczkowski, Apex, NC (US); Sanjay Basu, Frisco, TX (US); James A. Ellers, Portland, OR (US)

(73) Assignee: EMC IP Holding Company LLC, Round Rock, TX (US)

(*) Notice: Subject to any disclaimer, the term of this patent is extended or adjusted under 35 U.S.C. 154(b) by 159 days.

(21) Appl. No.: 14/577,149

(22) Filed: Dec. 19, 2014

(51) Int. Cl.
*H04L 12/26* (2006.01)
*H04L 29/08* (2006.01)

(52) U.S. Cl.
CPC .............. *H04L 67/10* (2013.01); *H04L 43/10* (2013.01)

(58) Field of Classification Search
CPC ......... H04L 67/10; H04L 43/10; H04L 41/08; G06F 8/60; G06F 8/71
USPC ....................................................... 709/217
See application file for complete search history.

(56) References Cited

U.S. PATENT DOCUMENTS

| | | | | |
|---|---|---|---|---|
| 6,363,411 B1* | 3/2002 | Dugan | .............. | H04M 3/42136 379/201.01 |
| 2008/0244706 A1* | 10/2008 | Lenoir | .................... | G06F 21/10 726/4 |
| 2011/0099255 A1* | 4/2011 | Srinivasan | .......... | H04L 41/0866 709/221 |
| 2012/0179802 A1* | 7/2012 | Narasimhan | .......... | H04L 41/046 709/223 |
| 2014/0026131 A1* | 1/2014 | Ravi | ................... | G06F 9/44505 717/177 |
| 2014/0143401 A1* | 5/2014 | Carlen | .................. | G06F 9/5072 709/223 |
| 2015/0277884 A1* | 10/2015 | Giammaria | ............... | G06F 8/60 717/120 |
| 2015/0356000 A1* | 12/2015 | Giammaria | ............. | H04L 63/00 717/127 |
| 2016/0094410 A1* | 3/2016 | Anwar | ................ | H04L 67/1095 709/223 |

OTHER PUBLICATIONS

Microsoft Computer Dictionary, Fith Edition, 2002. p. 336.*

* cited by examiner

*Primary Examiner* — Tan Doan
(74) *Attorney, Agent, or Firm* — Polsinelli PC (57) ABSTRACT

A compliance-based application deployment system for a cloud computing environment includes a computing system that executes a service to obtain a computing node compliance level for each of multiple computing nodes configured in the cloud computing environment. When a request is received to provision an application, the service provisions the application on one of the computing nodes having a specified compliance level included in the request.

18 Claims, 9 Drawing Sheets

COMPUTING NODE SELECTION SCREEN

Please select a computing node for your application:

| COMPUTING NODE NAME | LOCATION | COMPLIANCE LEVEL | COST |
|---|---|---|---|
| DALLAS-423-A | DALLAS, TX | PCI | $X.XX |
| DENVER-5A32 | DENVER, CO | | $X.XX |
| DENVER-5A27 | DENVER, CO | HIPPA, PCI | $X.XX |
| ATLANTA-7876 | ATLANTA, GA | PCI | $X.XX |
| MIAMI-34UY-1A | MIAMI, FL | HIPPA | $X.XX |
| KANSAS-ASIU1 | KANSAS, MO | | $X.XX |

Cancel    Continue

COMPLIANCE-BASED APPLICATION DEPLOYMENT SYSTEM AND METHOD FOR A CLOUD COMPUTING ENVIRONMENT

TECHNICAL FIELD

Aspects of the present disclosure relate to computing devices and, in particular, to a compliance-based application deployment system and method for a cloud computing environment.

BACKGROUND

Computing environments used by enterprises, such as corporations and universities, are often provided by multiple computing devices that function in a collaborative manner to meet the computing resource needs of the enterprise. Current trends in the computing industry have evolved to provide cloud computing environments in which computing resources are leased, rather than purchased by consumers (e.g., tenants) to provide enhanced economies of scale. Nevertheless, security issues may arise when multiple tenants use the same resources. Such cases have necessitated the use of private cloud installations where the type and nature of all tenants may be closely controlled.

SUMMARY

According to one aspect of the present disclosure, a compliance-based application deployment system for a cloud computing environment includes a computing system that executes a service to obtain a computing node compliance level for each of multiple computing nodes configured in the cloud computing environment. When a request is received to provision an application, the service provisions the application on one of the computing nodes having a specified compliance level included in the request.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same components throughout the different views. The drawings depict only typical embodiments of the present disclosure and, therefore, are not to be considered limiting in scope.

FIG. 10 illustrates an example data source that may be used with the compliance-based application deployment system of FIG. 1A.

DETAILED DESCRIPTION

Embodiments of the present disclosure provide an application deployment system that considers compliance when deploying applications in a cloud computing environment. The compliance of applications generally includes the configuration settings of the computing devices on which they are executed as well as how the computing devices may be arranged relative to one another in order to maintain a specified level of performance and/or security. The system obtains compliance policy information for each computing node configured in a cloud computing environment and caches this information in a data source. As an application is being deployed, the system selects a computing node meeting a specified compliance policy associated with the application. Selection of a particular computing node may be automatically performed by the system, or may be manually selected by a tenant when the system is configured in a multi-tenant computing environment.

Deploying an application within a cloud computing environment often requires significant effort. For example, when provisioning an application in a multi-tier (N-tier) computing environment, multiple security zones typically need to be defined for information to flow between the components of the application. Additionally, various resources (e.g., hosts, virtual machines (VMs), etc.) for each tier must be individually defined and/or created. Shared resources, such as firewalls and load balancers, also contribute to the complexity of deploying the application in a N-tier computing environment.

For simple computing systems, the deployment of an application can be accomplished without regard to the type and quality of the environment that it will be deployed in. During its deployment, the application could be customized (e.g., tuned) for operation in its respective cloud computing environment. However, deployment of an application may become significantly more complicated when deployed in more advanced computing environments, such as cloud computing environments that may have multiple computing nodes (e.g., converged infrastructures, computer clusters, computing grids, blade arrays, etc.). For example, when applications are deployed in a cloud computing environment that supports multiple tenants (e.g., users), care should be taken to ensure that the operation of an application used by one tenant does not adversely affect the operation of another application used by another tenant.

Usually, each tenant builds their own application with their own customized configuration. In some cases, each computing node in the cloud computing environment may deploy each tenant's application without impacting any other tenant using certain networking (e.g., communication) constructs that provide sufficient isolation of the environment used by one application relative to another application. These constructs may provide choices in features and protocol support depending on the hardware and software components in use. Additionally, tenants may wish to use platform specific features in their application designs.

Traditionally, identifying whether a given computing node is compliant to a particular compliance policy has been a relatively unstructured endeavor. For example, administrators often share compliance policy information for the computing nodes they manage using word-of-mouth, hearsay communications about what is commonly known about each computing node, which is often inaccurate or out of date. That is, without a continual evaluation of the compliance policies of each computing node, administrators may not be aware when it is no longer compliant with a particular compliance policy. In many cases, administrators make a best guess determination whether a particular computing node has a sufficient compliance level to support deployment of an application.

Nevertheless, problems may be incurred when an application is to be deployed in the cloud computing environment with multiple tenants, each having their own differing objectives, such as compliance with one or more performance and/or security objectives, that may affect the objectives of applications deployed on the same computing node. For example, compliance specifications, such as those required by the payment card industry (PCI) or the Health Insurance Portability and Accountability Act (HIPPA) typically places certain constraints on the configuration of each computing node on which compliant applications are run. The PCI compliance specification, for example, places constraints upon which type of applications may share a common computing node to reduce the risk of security breaches where data used by one PCI compliant application is inadvertently exposed to another application. As such, validating that a computing node in a cloud computing environment is PCI or HIPPA compliant and then ensuring the application is deployed only to a valid PCI or HIPPA compliant infrastructure is a non-trivial task.

Conventional practices for deploying applications in a multi-tenant cloud computing environment to ensure certain compliance objectives are met often require manual configuration, which is often time consuming and error prone. To deploy an application, a tenant is often required to create each resource (e.g., VM) of the computing node from a template and then manually customize that resource. The network, firewall and load balancer rules are then manually configured for each installed resource. As the computing node grows over time due to its scalability, these configurations are manually maintained, which often leads to configuration errors and difficulty in maintaining the application.

Figure 1A:
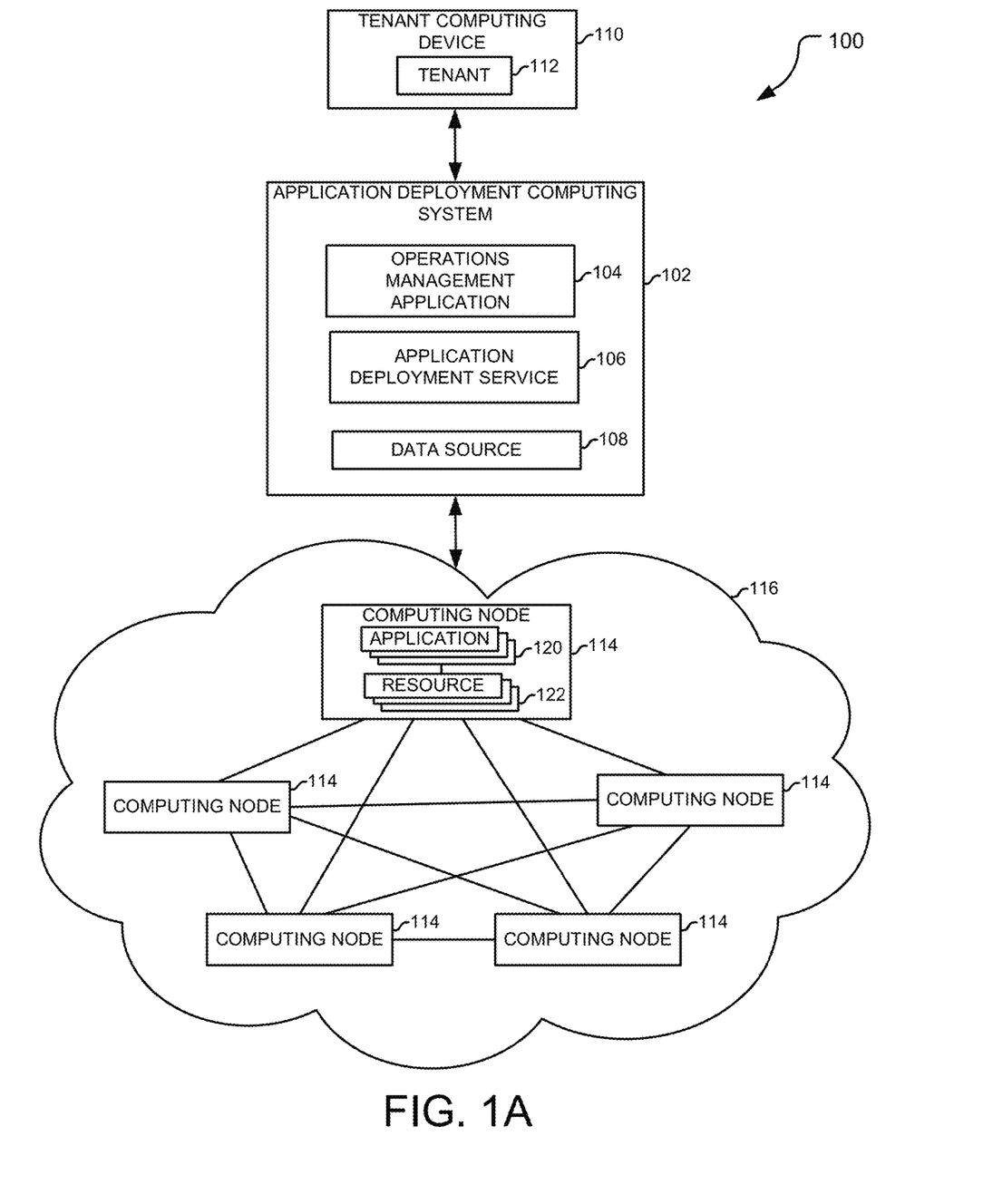
FIG. 1A illustrates an example compliance-based application deployment system according to the teachings of the present disclosure.

FIG. 1A illustrates an example compliance-based application deployment system 100 according to the teachings of the present disclosure. The compliance-based application deployment system 100 addresses the problems discussed above with conventional management operations systems among other benefits and solutions. The system 100 includes an operations management application 104, an application deployment service 106, and a data source 108. The application deployment service 106 communicates with a computing device 110 used by a tenant 112 to facilitate selection of a computing node 114 having a compliance level sufficient to maintain a specified compliance level defined by the tenant 112.

The computing nodes 114 as shown herein are arranged in a cloud computing environment 116 in which each computing node 114 executes one or more applications 120 using one or more resources 122 of that computing node 114. Although only one computing node is shown configured with multiple applications and resources, it should be understood that any of the other computing nodes may also be configured with multiple applications and corresponding resources.

The computing nodes 114 generally refer to individual computing structures that communicate with other computing structures to perform the overall functionality of the cloud computing environment 116. For example, the computing nodes 114 may include devices, such as unified computing systems, fabric-based computing systems, and dynamic infrastructures. In one embodiment, one or more of the computing nodes 114 may be distributed computing systems, such as converged infrastructures as described below with reference to FIGS. 2A and 2B. In another embodiment, each computing node 114 may comprise a tier of a multi-tier (N-tier) computing environment as described below with reference to FIG. 3. Nevertheless, it should be understood that the system 100 may be used to create or otherwise manage applications 120 on any computing environment having distributed nodes whose compliance levels may be measured and controlled.

Each application 120 generally includes a set of instructions that may be deployed or otherwise distributed over one or several computing nodes 114 in the cloud computing environment 116. In one embodiment, the applications 120 include those configured in a N-tier architecture in which the operation of each application is performed by multiple tiers that are physically separated from one another and function in a collaborative manner to perform the various tasks of that application. Each computing node 114 includes multiple resources 122 that may each be assigned to execute at least a portion of an application 120.

The tenant 112 generally refers to a client of the cloud computing environment 116 who owns and manages at least one of the applications 120. In many cases, the tenant 112 does not purchase resources 122 to be used for deployment of the application, but rather uses the resources on a lease-by-lease basis. Although embodiments herein describe deployment of the application by the tenant, other embodiments contemplate that any user, such as an administrator of the computing node 114, or cloud computing environment 116, may deploy the application on behalf of the tenant 112. In the example system described herein, each tenant computing device 110 includes a processing system that executes instructions stored in a memory for performing the one or more features described herein.

Although the illustrated cloud computing environment 116 only shows computing nodes 114, it should be understood that the cloud computing environment may include other components, such as gateways for secure management of data used by the tenants, communication nodes for communication among the multiple computing nodes 114, and/or other devices that support the overall operation of the cloud computing environment 116.

The application deployment service 106 manages the operation of the computing nodes 114 of the cloud computing environment 116, which may include provisioning applications 120 on the computing nodes 114. In one embodiment, the application deployment service 106 uses an operations management application 104 that maintains information about the resources used in the cloud computing environment 116, and may also control one or more operational characteristics of the resources. Any suitable type of operations management application 104 may be implemented with the teachings of the present disclosure. In one embodiment, the operations management application includes a vSphere™ software suite that is available from VMware Corporation, which is headquartered in Palo Alto, Calif.

The compliance of resources generally refers to verification of the configuration of those resources to ensure certain objectives (e.g., security objectives, performance objectives, etc.) are met. For example, one compliance policy may include verifying that only certain communication ports that are required for operation of the application are open while verifying that all other communication ports (e.g., telnet ports) are closed. Other example compliance policies may include verification of a quantity and/or performance level of any processors, an amount of memory allocated to the resource, what other resources that may communicate with the subject resource (e.g., service chains), load balancing rules, redundant memory locations, and the like.

In one embodiment, the application deployment service 106 generates an application deployment specification that includes a compliance level to be applied to an application that is to be deployed in a cloud computing environment or has already been deployed in the cloud computing environment. For example, the application deployment service 106 may generate a Topology and Orchestration Specification for Cloud Applications (TOSCA) specification or an Open Virtualization Format (OVA) specification that includes a compliance level to be maintained by the computing node in which the application is deployed. The TOSCA or OVA specification may include metadata that is compared against one or more computing nodes in the cloud computing environment to determine which computing node it best suited to deploy the application at the required compliance level.

The application deployment computing system 102, the tenant computing device 110, and the cloud computing environment 116 communicate with one another in any suitable manner, such as using wireless, wired, and/or optical communications. In one embodiment, the application deployment computing system 102, the tenant computing device 110, and the cloud computing environment 116 communicates with one another using a communication network, such as the Internet, an intranet, or another wired and/or wireless communication network. In another embodiment, the application deployment computing system 102 and the cloud computing environment 116 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the application deployment computing system 102 and the cloud computing environment 116 may communicate with one another without the use of a separate and a distinct network.

Figure 1B:
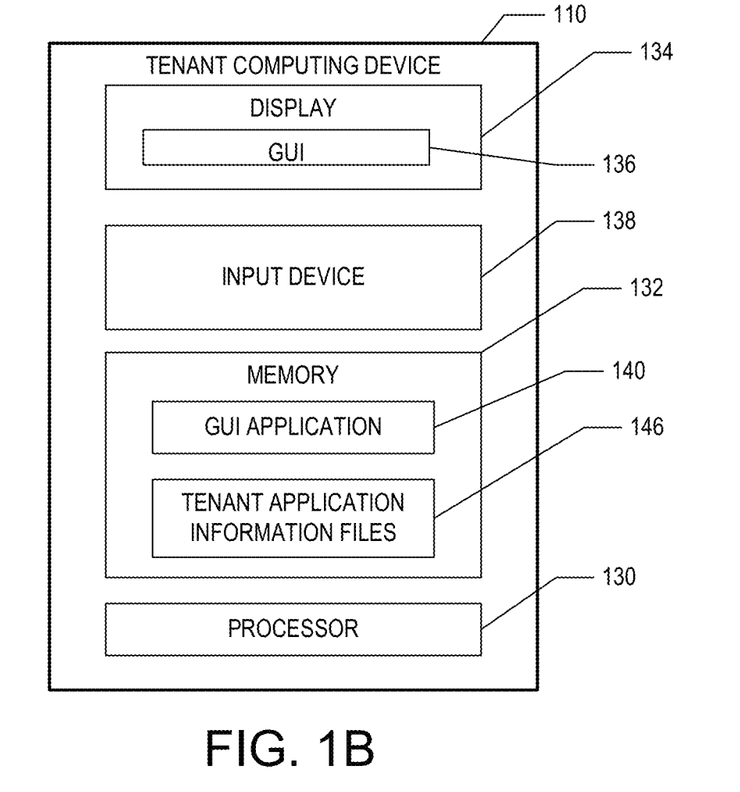
FIG. 1B illustrates an example tenant computing device according to one embodiment of the present disclosure.

FIG. 1B depicts an example tenant computing device 110 according to one embodiment of the present disclosure. The computing device 110 is a computing or processing device that includes one or more processors 130 and memory 132 and is to receive data and/or communications from, and/or transmit data and/or communications to, the application deployment computing system 102 via a communication network as described above. The computing device 110 includes a display 134, such as a computer monitor, for displaying data and/or a graphical user interface (GUI) 136. The computing device 110 may also include an input device 138, such as a keyboard or a pointing device (e.g., a mouse, trackball, pen, or touch screen) to enter data into or interact with the graphical user interface 136. In one embodiment, the display 134 comprises a touchscreen device in which input is provided via contact by the user with the touchscreen device.

In one embodiment, the tenant computing device 110 comprises a GUI application 140, such as a browser application, or application software (e.g., a mobile app) stored in the memory 132 and executed on the processors 130 to generate the GUI 136 to the display 134. The GUI enables the computing device 110 of the tenant to interact with one or more data entry forms received from the application deployment computing system 102 to received compliance information and enter data associated with deployment of an application 120. In other embodiments, the tenant computing device 110 includes other forms of user interfaces for interacting with the tenant, such as a command line interface (CLI).

In another embodiment, the memory 132 of the tenant computing device 110 also stores tenant application information files 146 that includes information about any applications 120 deployed in the cloud computing environment 116. For example, the tenant application information files 146 may include various information for each application 120, such as which computing nodes and/or resources are used to execute the application as well as the compliance level of each of the computing nodes and/or resources used to execute the application.

Figure 1C:
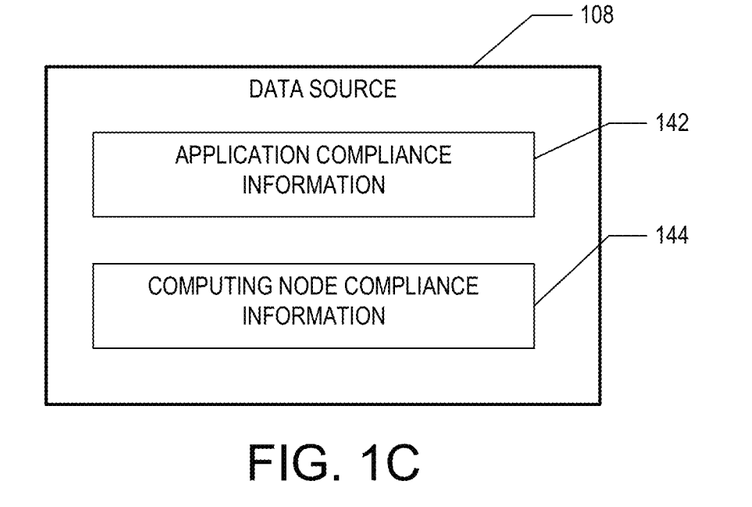

As shown in FIG. 1C, the data source 108 stores application compliance information 142 and computing node compliance information 144. The application compliance information 142 includes specified compliance level information provided by the tenant 112 when the application is deployed. The application compliance information 142 may include standardized compliance level information (e.g., PCI or HIPPA compliance levels) and/or may include customized compliance information. The computing node compliance information 144 includes compliance level information associated with each computing node 114 in the cloud computing environment 116. In one embodiment, the computing node compliance information 144 may include compliance information associated with each resource of the computing node, such as the resources of each tier of a N-tier computing environment as described below.

Figure 2A:
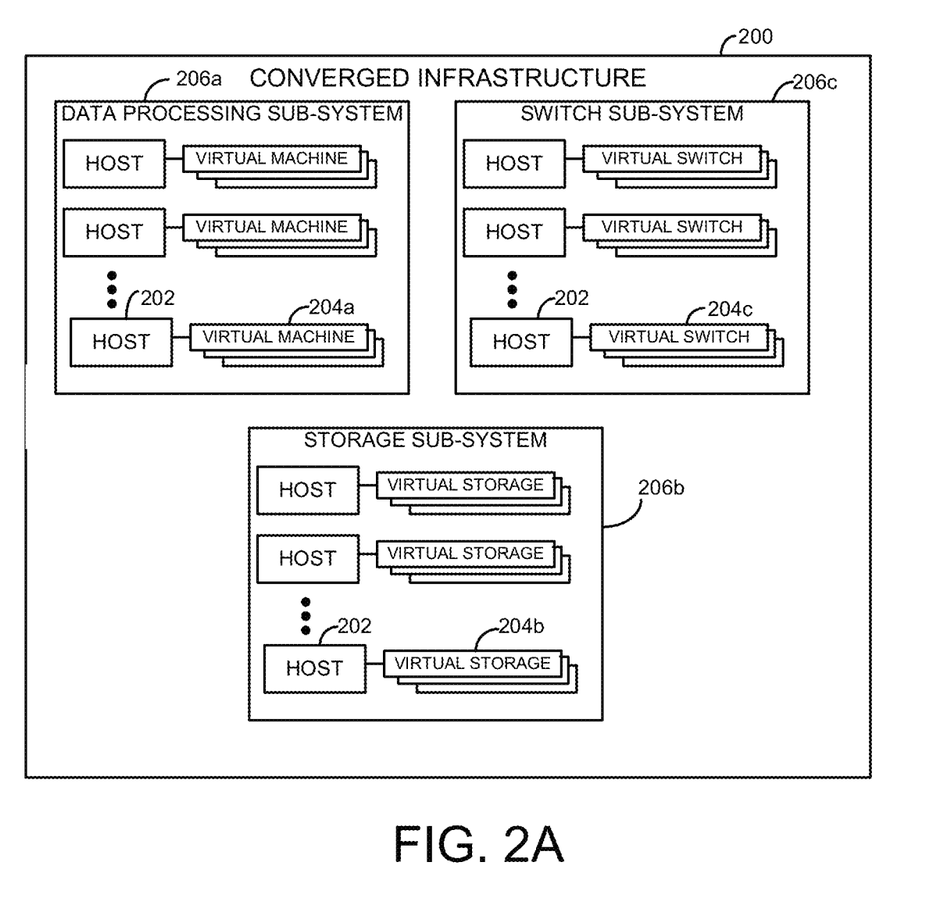
FIGS. 2A and 2B illustrate an example converged infrastructure that may be implemented as one computing node in the cloud computing environment of FIG. 1 according to the teachings of the present disclosure.

FIG. 2A illustrates an example converged infrastructure 200 that may be implemented as one computing node 114 in the cloud computing environment 116 of FIG. 1 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures may include additional, fewer, or different types of sub-systems without departing from the spirit and scope of the present disclosure. For example, the converged infrastructure 200 may include one or more physical machines, physical switches, and/or physical storage objects in addition to, or in place of the virtual machines 204a, virtual switch objects 204c, and/or the virtual storage objects 204b as shown in FIG. 2A.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is headquartered in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that a cloud computing environments, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Figure 2B:
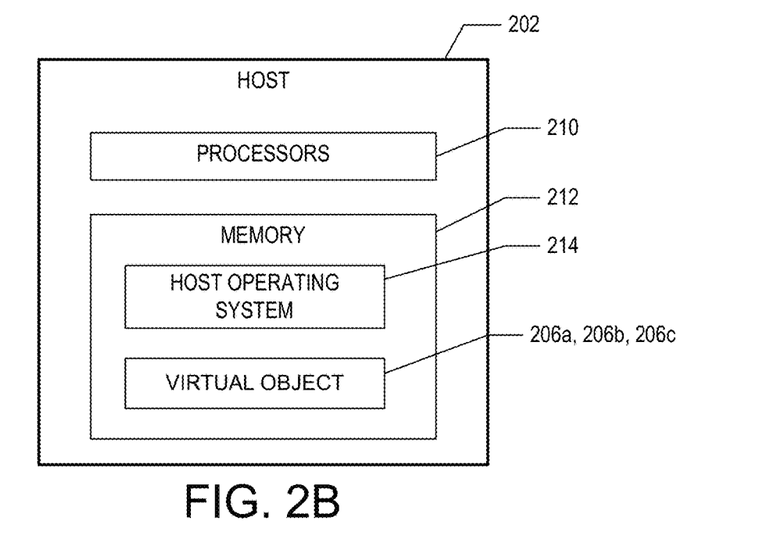

FIG. 2B illustrates an example host 202 implemented on each converged infrastructure 200 according to one aspect of the compliance-based application deployment system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the virtual objects (e.g., VMs 204a, virtual storage objects 204b, and virtual switch objects 204c) may be implemented as resources 122 of the cloud computing environment 116. Each virtual object may be instantiated or deleted under control of the host operating system 214, which is in turn, controlled by the operations management application 104. That is, the host operating system 214 may be controlled by the operations management application 104 to instantiate new virtual objects as they are needed and destroyed to alleviate excess capacity in their associated hosts 202. Although the present embodiment discloses one particular type of computing structure that may be implemented as an N-tier computing environment, it should be understood that any computing environment that may adjust, add, and/or delete resources according to the needs of applications executed on the computing environments may be viable alternatives.

Figure 3:
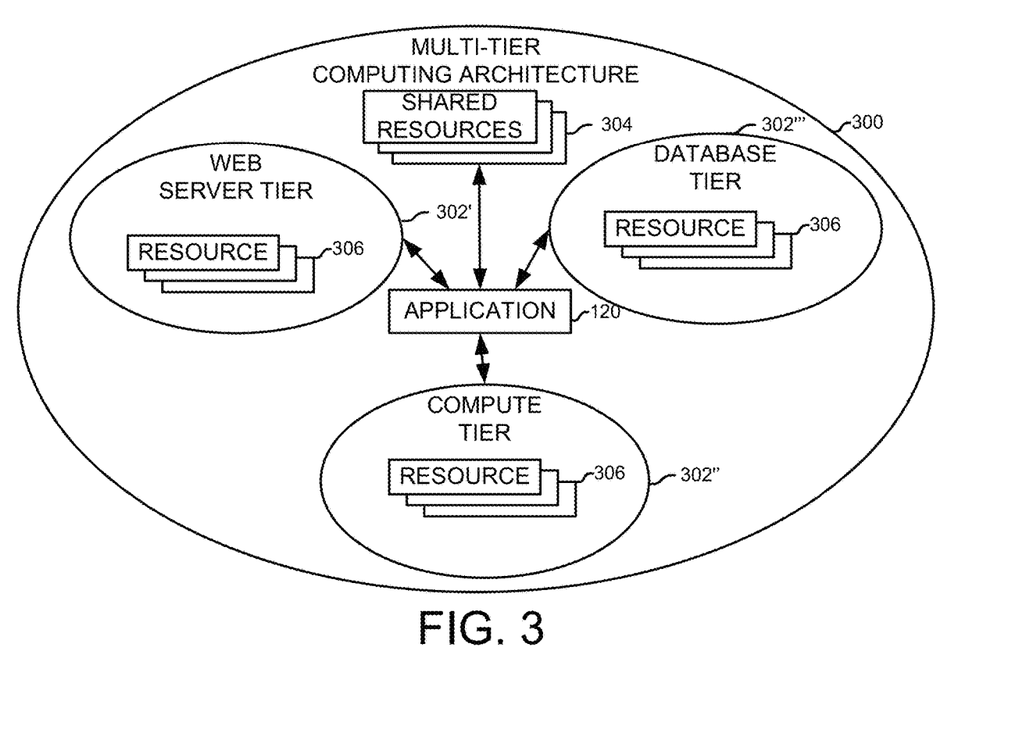
FIG. 3 illustrates an example multi-tier (N-tier) environment that may be implemented as the cloud computing environment of FIG. 1 according to the teachings of the present disclosure.

FIG. 3 illustrates an example N-tier environment 300 that may be implemented as the cloud computing environment 116 of FIG. 1 according to the teachings of the present disclosure. The N-tier computing environment 300 as shown includes a web server tier 302', a compute tier 302", a database tier 302''', and shared resource 304 that perform various tasks of one or more applications 120 deployed in the N-tier computing environment 300. Each of the web server tier 302', compute tier 302", and database tier 302''' include resources 306 that perform the functions of their respective tier. Although a web server tier 302', a compute tier 302", and a database tier 302''', and shared resources 304 are shown, it should be understood that the N-tier computing environment 300 may include any type and quantity of tiers that are physically separated from one another and function in a collaborative manner to perform the various tasks of an application executed in the N-tier computing environment 300. In general, the web server tier 302' functions as a presentation layer to provide a user interface for the application 120, the compute tier 302" coordinates the activities of the application, processes commands, and performs logical decisions and calculations to support the functionality of the application 120, while the database tier 302''' generally functions as a storage unit to store data used by the application 120. The shared resources 304 generally include resources of the cloud computing environment 116 that may be shared by multiple applications. Examples of such shared resources 304 include load balancers and/or network devices, such as switches, routers, or firewalls.

Figure 4:
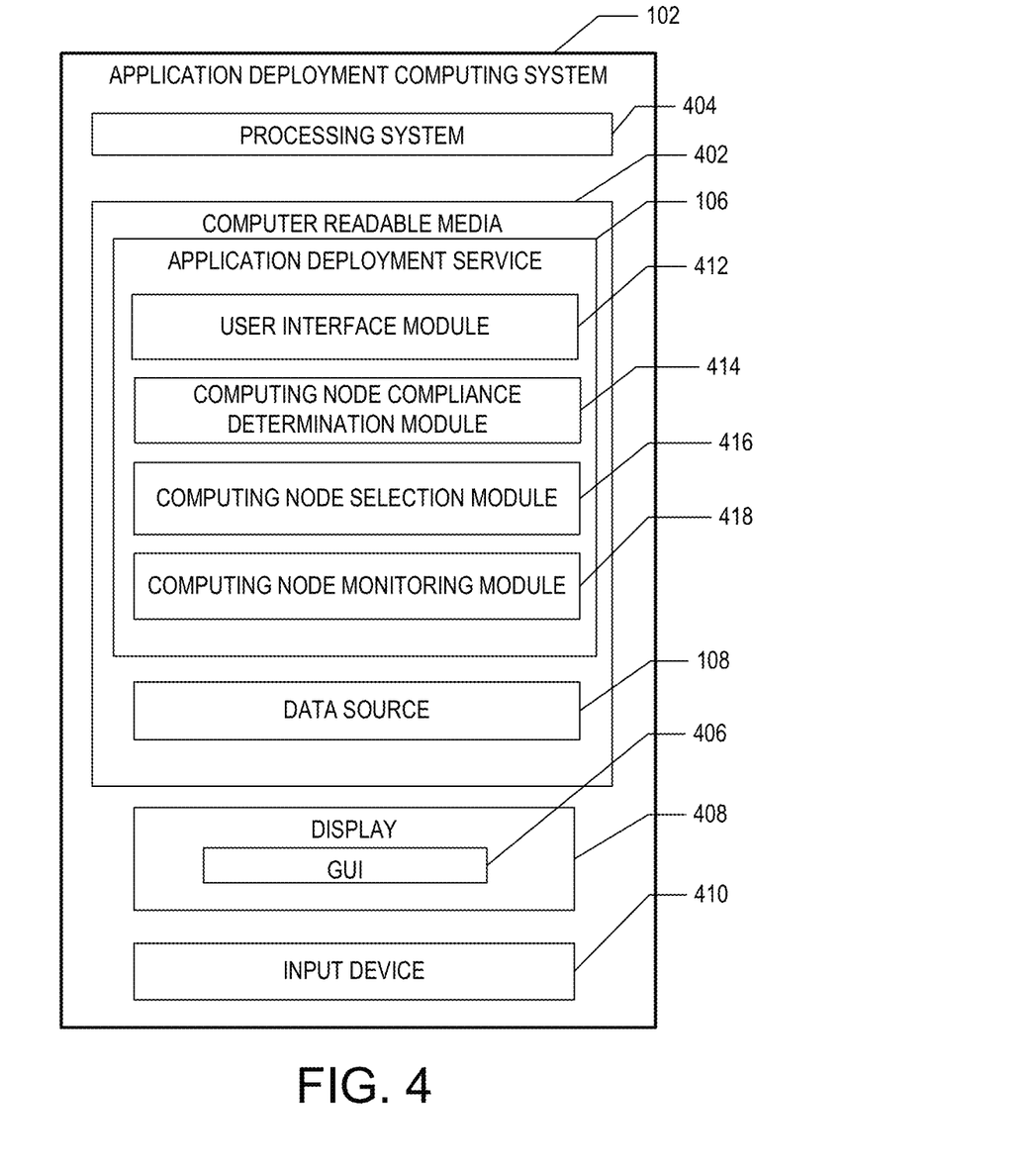
FIG. 4 illustrates an example application deployment computing system on which the application deployment service may be executed according to one embodiment of the present disclosure.

FIG. 4 illustrates an example application deployment computing system 102 on which the application deployment service 106 may be executed according to one embodiment of the present disclosure. The application deployment service 106 is stored in a computer readable media 402 (e.g., memory) and is executed on a processing system 404 of the application deployment computing system 102. A processor is hardware. The computer readable medium 402 includes volatile media, nonvolatile media, removable media, non-removable media, and/or another available medium. By way of example and not limitation, non-transitory computer readable medium 402 comprises computer storage media, such as non-transient storage memory, volatile media, non-volatile media, removable media, and/or non-removable media implemented in a method or technology for storage of information, such as computer readable instructions, data structures, program modules, or other data.

According to one embodiment, the application deployment computing system 102 also includes a graphical user interface (GUI) 406 displayed on the display 408, such as a computer monitor, for displaying data. The application deployment computing system 102 also includes an input device 410, such as a keyboard or a pointing device (e.g., a mouse, trackball, pen, or touch screen) to enter data into or interact with the GUI 406. According to one aspect, the operations management application 104 includes instructions or modules that are executable by the processing system 402 as will be described in detail herein below.

A user interface module 412 facilitates the receipt of input data and/or output data from or to a tenant, respectively. For example, the user interface module 412 may generate the GUI 136 to the display 134 of the tenant computing device 110 in which the GUI displays information associated with each computing node 114 implemented in the cloud computing environment 116 and provide one or more fields for entering a desired specified compliance level by the tenant. The user interface module 412 may also display computing node 114 information and compliance level information by other means, such as by a command line interface (CLI) displayed on the display 134.

A computing node compliance level determination module 414 obtains compliance level information from each computing node 114 in the cloud computing environment 116. The computing node compliance level determination module 414 may obtain the compliance level information via manual intervention with a user who manually inputs the compliance level information, or automatically by a computer implemented system that communicates with each computing node 114 to obtain the compliance level information.

A computing node selection module 416 manages the selection of a suitable computing node to be provisioned with the application. The computing node selection module 416 may communicates with the user interface module 412 to generate a selectable field in the GUI 136 that allows the tenant to select a desired computing node 114, or the computing node selection module 416 automatically selects a suitable computing node for the application with no input from the tenant.

A computing node monitoring module 418 obtains compliance level information for the computing nodes 114 in the cloud computing environment 116 at ongoing time intervals (e.g., once a day, once a week, once a month, upon user request, etc.) and compares the obtained compliance level of each computing node 114 with the specified compliance level of each application provisioned on that computing node 114, and generates an alert when the compliance level of the computing node 114 goes below the specified compliance level of the computing node 114. For example, a particular application having a HIPPA compliance level is initially provisioned on a computing node having at least a HIPPA compliance level. Over a period of time, however, the configuration of that computing node 114 has changed such that it is no longer in compliance with the HIPPA compliance specification. At the next time that the computing node monitoring module 418 obtains compliance level information for that computing node, it will generate an alert indicating that an non-compliant situation exists for that computing node. The alert may be any type that notifies appropriate personnel of the non-compliant condition. For example, the alert may comprise an e-mail message transmitted to administrators of that computing node and/or the tenant who owns the affected application.

It should be appreciated that the modules described herein are provided only as examples, and that the application 120 may have different modules, additional modules, or fewer modules than those described herein. For example, one or more modules as described in FIG. 4 may be combined into a single module. As another example, certain modules described herein may be encoded on, and executed on other computing systems, such as on one of the resources 122 of the cloud computing environment 116.

Figure 5A:
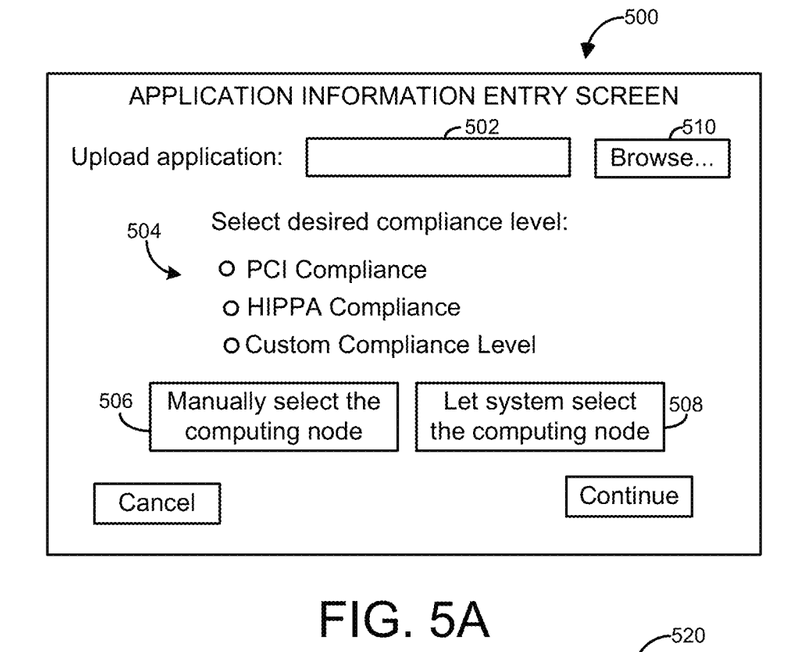
FIGS. 5A and 5B illustrate example screenshots of an application information entry screen and a customized compliance level entry screen, respectively, that may be used to deploy an application in a cloud computing environment according to one embodiment of the present disclosure.
Figure 5B:
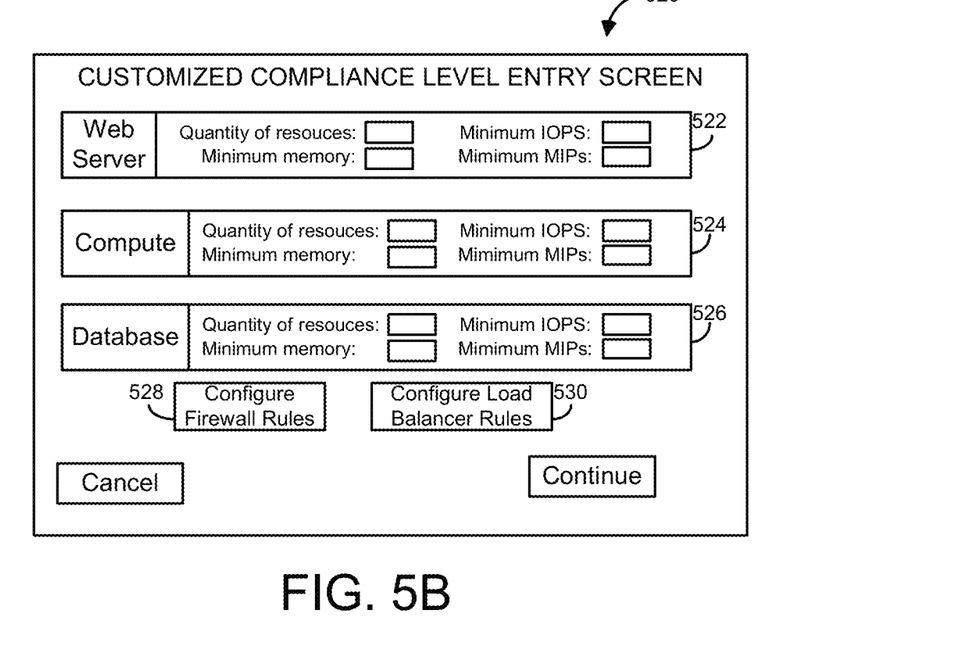

FIGS. 5A and 5B illustrate example screenshots of an application information entry screen 500 and a customized compliance level entry screen 520, respectively, that may be used to deploy an application 120 in a cloud computing environment 116 according to one embodiment of the present disclosure. In general, the application deployment service 106 uses the application information entry screen 500 and the customized compliance level entry screen 520 to allow a tenant to specify the compliance policies of the application they wish to deploy. For example, the application information entry screen 500 and the customized compliance level entry screen 520 may be used to specify various minimum performance objectives (e.g., a quantity of the resources 122 to be allocated, a minimum amount of memory for each allocated resource 122, a minimum level of IOPS for each allocated resource 122, and a minimum level of MIPS for each allocated resource 122) that may be used by the application deployment service 106 to ensure that any resources 122 used to execute the application 120 are capable of executing the application 120 at the specified minimum performance compliance level.

The application information entry screen 500 and a customized compliance level entry screen 520 allow the tenant 112 to input a number of configurations when creating a new application, such as a basic network configuration, a storage configuration for the application, as well as more advanced configurations, such as defining the network configuration between a series of VMs to be used in an application (e.g., firewall rules, load balancer rules, etc.). The application deployment service 106 compares the entered compliance policies with the compliance levels obtained for each computing node in the cloud computing environment and facilitates selection of the computing nodes that provides the specified compliance policy.

The application information entry screen 500 as shown includes an application upload entry field 502, a compliance level selection field 504, a manual computing selection button 506, and an automatic computing node selection button 508. The application upload entry field 502 is provided to facilitate receipt of the tenant's application to be deployed by the system 100. For example, the name and path of the desired application may be entered directly, or selected from the file system of the tenant computing device 110 using the 'browse' button 510 displayed on the application information entry screen 500 to select an application to be uploaded to the cloud computing environment 116. The compliance level selection field 504 provides for user entry of a certain compliance level to be applied to the uploaded application to be deployed. As shown, the compliance level selection field 504 provides for selection of a standard compliance level, such as the PCI compliance level, or the HIPPA compliance level. Alternatively, the compliance level selection field 504 provides for customized selection of a compliance level to be applied to the application. Although the compliance level selection field 504 provides for the PCI compliance level and the HIPPA compliance level, the compliance level selection field 504 may include any suitable standard compliance level.

The customized compliance level entry screen of FIG. 5B provides for the entry of customized compliance level to be associated with the application. The customized compliance level entry screen 520 may be displayed when the application deployment service 106 receives selection of a custom compliance level from the compliance level selection field 504 of the application information entry screen 500. The customized compliance level entry screen 520 provides for the manual entry of customized compliance levels to be assigned to the application. For example, the customized compliance level entry screen 520 includes customized compliance level information fields 522, 524, and 526 for each tier of a N-tier computing environment, such as the web server tier, the compute tier, and the database tier, respectively. For example, the application deployment service 106 may use the customized compliance level information fields 522, 524, and 526 for manual entry of a quantity of resources to be allocated for each of the web server tier, the compute tier, and the database tier by the user. Other customized compliance level information may include a minimum level of input/output bits per second (IOPS), a minimum amount of memory, and a minimum level of million instructions per second (MIPS) to be maintained by each resource. Nevertheless, the customized compliance level information fields may include other criteria associated with the compliance of resources, such as a number of processors to be used by each resource, a throughput rate to be incorporated into each port of the resource, and the like.

The customized compliance level entry screen 520 may also provide for manipulation of the compliance values to be applied to the shared resources used by the application. For example, the customized compliance level entry screen 520 may include a firewall rules configuration button 528 and a load balancer rules configuration button 530, that when selected by the tenant, provides for entry of customized compliance rules to be applied to any firewalls and load balancers used by the application.

Figure 6:
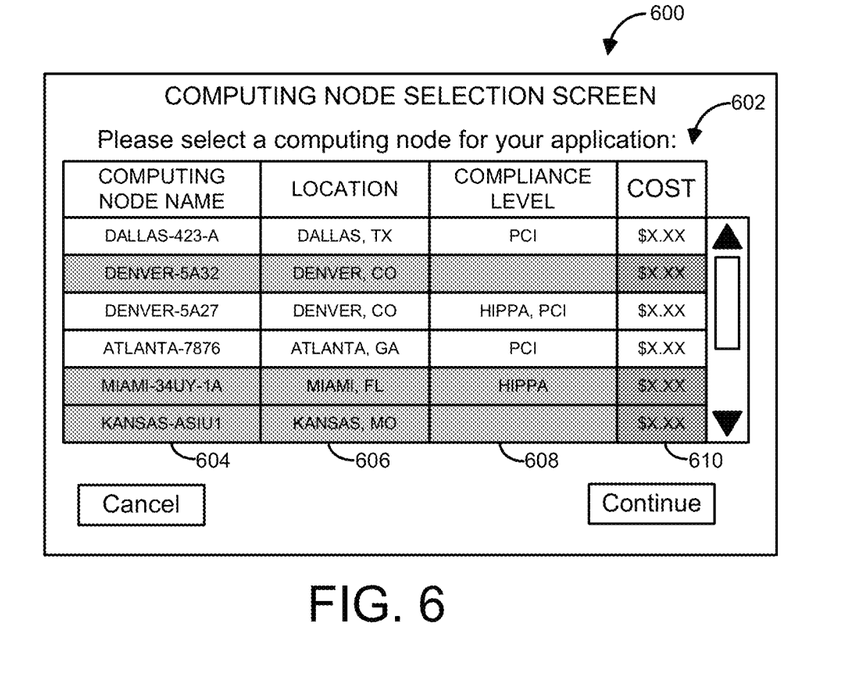
FIG. 6 illustrates an example computing node selection screen that may be used to receive manual selection of a computing node on which the application is to be deployed according to one embodiment of the present disclosure.

FIG. 6 illustrates an example computing node selection screen 600 that may be used to receive manual selection of a computing node on which the application is to be deployed according to one embodiment of the present disclosure. The application deployment service 106 may automatically select a computing node 114 on which the application is to be deployed, or alternatively, may allow the tenant to select a computing node 114 for deployment of the application. If the application deployment service 106 selects the computing node to be implemented with the application, the application deployment service 106 compares the information provided by the tenant using the application information entry screen 500 and the customized compliance level entry screen 520 to automatically select a computing node to be used. However, if the tenant is allowed to manually select a computing node, the computing node selection screen of FIG. 6 may be used.

The computing node selection screen 600 generally displays a list of some, or all computing nodes implemented in the cloud computing environment 116 along with certain other characteristics of each computing node that may be useful for manual selection of a desired computing node by the tenant. The computing node selection screen as shown, displays a table 602 that includes a computing node name column 604, a location column 606, a compliance level 608 column, and a cost column 610. The computing node name column 604 displays a name associated with a particular computing node. The location column 606 displays a location at which the computing node is currently deployed. The compliance level column 608 displays compliance levels for which its respective computing node is compliant, while the cost column 610 displays a relative cost to deploy the application on its respective computing node.

The application deployment service 106 provides for manual selection of a desired computing node using an input device such as a mouse or a keyboard of the tenant computing device 110 to select one of the displayed computing nodes. In one embodiment, entries in the table 602 associated with those computing nodes that are not compliant with the compliance information entered in the application information entry screen 500 and customized compliance level screen 520 may be greyed-out to indicate that those computing nodes are not compliant with the compliance level specified by the tenant. In one case, the application deployment service 106 may inhibit selection of a greyed-out entry by the tenant. In another case, the application deployment service 106 may generate a warning message indicating that the selected greyed-out entry is not compliant with the compliant values entered by the tenant in the application information entry screen 500 and/or customized compliance level screen 520, yet allow selection of the non-compliant computing node. For example, the application deployment service 106 may display a warning message that includes an override button to allow the tenant to select the non-compliant computing node if so desired.

As an example, the particular computing node selection screen 600 as shown has been generated by the application deployment service 106 due to entry of a tenant requesting a computing node that is compliant with the standard PCI compliance level. In this case, all computing nodes that are not compliant with the PCI compliance level are greyed-out (e.g., shaded) to indicate that they are not recommended for deployment of the application to be deployed. The other computing nodes not greyed-out in this case would be available for deployment of the application at the specified compliance level entered by the tenant.

Although FIGS. 5A, 5B, and 6 illustrate example entry screens that may be used for deploying application in a cloud computing environment having a specified compliance level, they may include additional, fewer, or different features without departing from the spirit and scope of the present disclosure. For example, computing node selection screen 600 may include entries with different colors to represent whether its respective computing node is compliant or not. Additionally, the application information entry screen 400 may include additional, fewer, or different standardized compliance from which the tenant may select a desired compliance level of the computing node.

Figure 7:
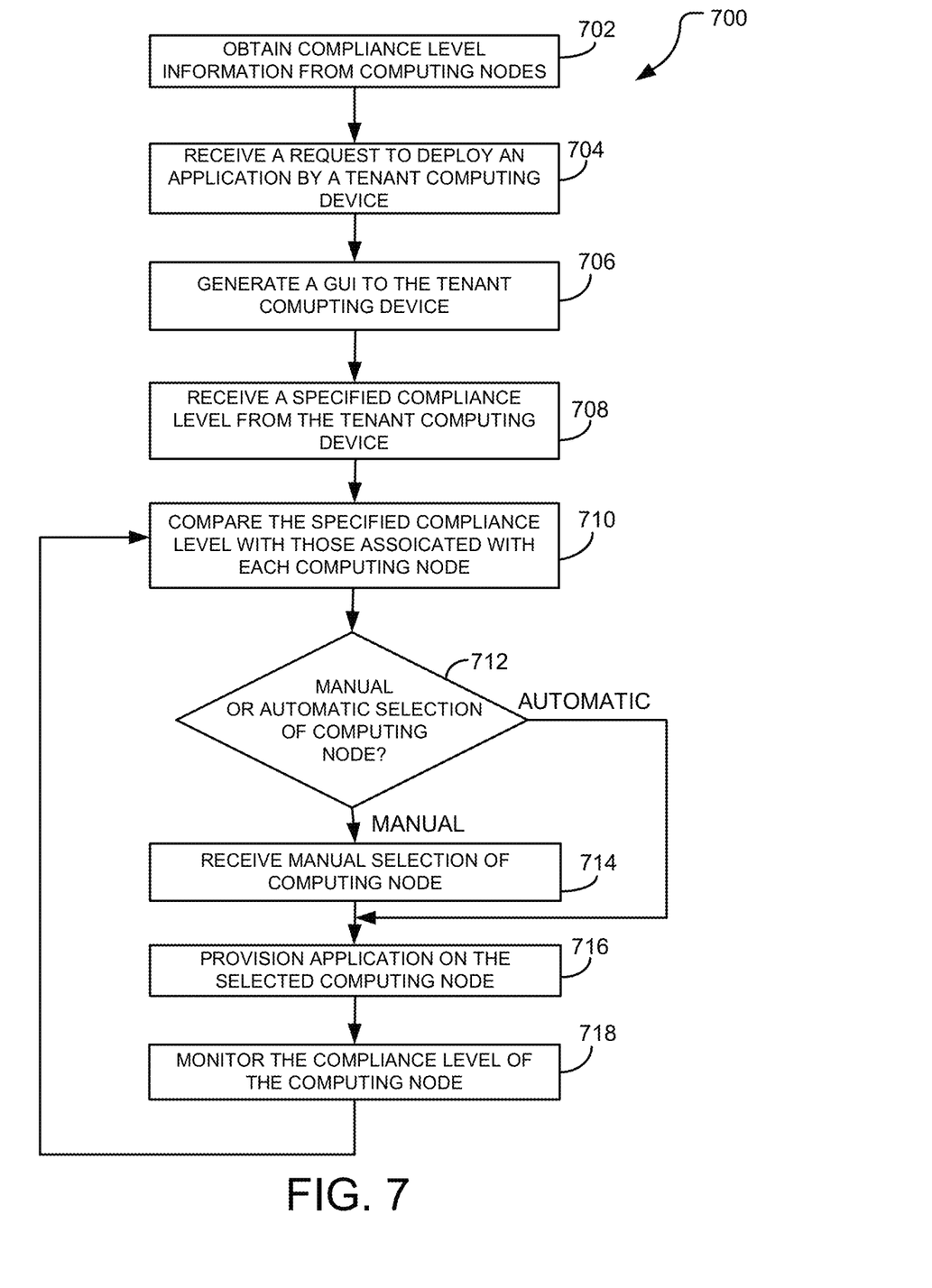
FIG. 7 illustrates an example process that may be performed by the application deployment service to facilitate deployment of an application having a compliance level specified by a tenant on one of multiple computing nodes of a cloud computing environment according to one embodiment of the present disclosure.

FIG. 7 illustrates an example process 700 that may be performed by the application deployment service 106 to facilitate deployment of an application having a compliance level specified by a tenant on one of multiple computing nodes of a cloud computing environment 116 according to one embodiment of the present disclosure.

In step 702, the application deployment service 106 obtains compliance level information from at least some computing nodes configured in a cloud computing environment. In one embodiment, the application deployment service 106 obtains compliance level information directly from the computing nodes or alternatively, the compliance level information is obtained from a computing node compliance level determination service. In one case, the compliance level information is obtained at ongoing (e.g., periodic) intervals, while in another case, the compliance level information is obtained whenever the compliance level for a particular computing node changes. For example, the application deployment service 106 may receive a message indicating a change to a compliance level for a particular computing node when the compliance level associated with that computing node has changed due to some event that has occurred with that computing node, such as, for example, crossing of a particular performance threshold level that may affect the overall performance of the subject computing node.

In step 704, the application deployment service 106 receives a request to deploy an application by a tenant. The user may be the tenant (e.g. customer) that owns the application, or any other user that deploys the application on behalf of the tenant (e.g., an administrator of the cloud computing environment). In response, the application deployment service 106 generates a GUI on the computing device 110 of the tenant 112 to receive information from the tenant for deploying the application in step 706.

In step 708, the application deployment service 106 receives, through the GUI, a specified compliance level to be maintained for the application that is to be deployed. The specified compliance level may be a standardized compliance level (e.g., a PCI compliance level, a HIPPA compliance level, etc.) or a customized compliance level including one or more parameters to be associated with each resource that is to be consumed by the application.

In step 710, the application deployment service 106 compares the specified compliance level provided by the tenant with the compliance level information obtained about each available computing node in the cloud computing environment to determine at least one computing node that meets the specified compliance level. In certain cases in which no computing node is found that meets the specified compliance level, the application deployment service 106 may issue a message to the tenant indicating that no suitable resource has been found. In such cases, the application deployment service 106 may provide user selection of whether to select other compliance level criteria in step 702 or halt deployment of the application 120.

In step 712, the application deployment service 106 may display an option for the tenant to select a computing node for deployment or may automatically select a computing node with no input from the tenant. For example, the application deployment service 106 may display an option to let the tenant select whether or not a compliant computing node is manually or automatically selected. If a compliant computing node is manually selected, processing continues at step 714; otherwise, processing continues at step 716.

In step 714, the application deployment service 106 displays a GUI to the computing device 110 of the tenant 112 that provides for user entry of a compliant computing node to be used for deployment of the application. In one case, the application deployment service 106 may allow selection of a non-compliant computing node, while generating an alert message notifying the tenant 112 that the selected computing node is non-compliant with the specified compliance level entered in step 708. In another case, the application deployment service 106 may restrict selection of a computing node to only those that are compliant with the specified compliance level entered in step 708. The GUI may also display a relative cost of each computing node relative to one another so that the tenant may decide upon a desired computing node based upon a cost associated with each computing node.

In step 716, the application deployment service 106 facilitates provisioning of the application on the selected computing node. In one embodiment, the application deployment service 106 communicates with an operations management application 104 that performs the act of provisioning the application on the selected computing node.

In step 718, the application deployment service 106 monitors the compliance level of the selected computing node at an ongoing basis. For example, the application deployment service 106 may communicate with a computing node compliance detection service such as described above to receive periodic compliance levels for each computing node in the cloud computing environment, or to receive an updated compliance level for each computing node whose compliance level has changed. When the compliance level of a computing node goes below the minimum specified compliance level of an application, the application deployment service 106 may continue processing at step 710 in which a new computing node may be selected for deployment of the application.

The previous steps may be repeatedly performed for ensuring compliant operation of computing nodes that are used to execute applications in a cloud computing environment. Nevertheless, when use of the application 120 is no longer needed or desired, the process ends.

Although FIG. 7 describes one example of a process that may be performed by the application deployment service 106, the features of the disclosed process may be embodied in other specific forms without deviating from the spirit and scope of the present disclosure. For example, the application deployment service 106 may perform additional, fewer, or different operations than those operations as described in the present example. As another example, the steps of the process described herein may be performed by a system other than the application deployment computing system 102, which may be, for example, one of the resources provided by the cloud computing environment 116.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 8:
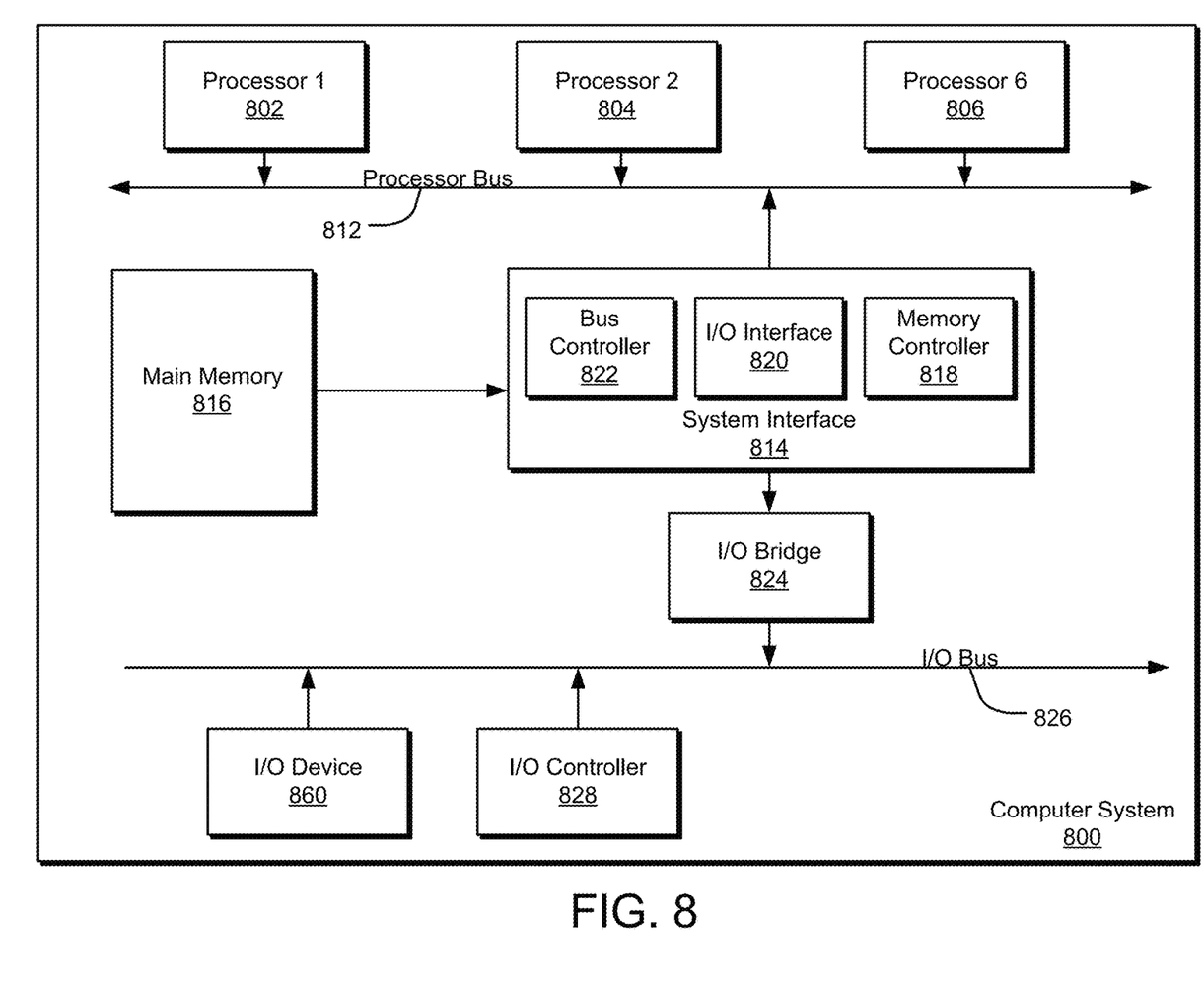
FIG. 8 is a block diagram illustrating an example of a computing device or computer system which may be used in implementing the embodiments of the present disclosure.

For example, FIG. 8 is a block diagram illustrating an example of a host or computer system 800 which may be used in implementing the embodiments of the present disclosure. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 860, as illustrated.

I/O device 860 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A compliance-based application deployment method comprising:

obtaining, using executable instructions stored in a non-transitory medium and executed on at least one processor, a compliance level for each of a plurality of computing nodes configured in a cloud computing environment;

generating, using the instructions, a standardized compliance specification instance;

appending to the standardized compliance specification instance, using the instructions, a compliance level metadata, wherein the compliance level metadata directly includes the obtained compliance level;

generating, using the instructions, a user interface on a display screen to receive a request to provision an application on the cloud computing environment, the request including a specified compliance level associated with the application, the request comprising an identification of a type of second application that is non-compliant with the application;

selecting, using the instructions, at least one compliant computing node from among the plurality of computing nodes, the obtained compliance level for the at least one compliant computing node meeting the specified compliance level, by:

retrieving the standardized compliance specification instance and extracting the obtained compliance level from the appended metadata of the standardized compliance specification instance;

comparing the obtained compliance level to the specified compliance level associated with the application; and selecting the at least one compliant computing node based on a determination that the obtained compliance level is not below the specified compliance level;

provisioning, using the instructions, the application on the selected at least one computing node; and monitoring, using the instructions, a configuration of the at least one computing node by a compliance detection service in communication with the at least one computing node, the compliance detection service updating the compliance level for each of the plurality of computing nodes in response to changes in the configuration of a respective computing node of the plurality of computing nodes;

wherein when an application of the specified type of second application that is non-compliant with the application is deployed to the at least one computing node based on the monitored configuration change of the at least one computing node, an at least second compliant computing node is selected from among the plurality of computing nodes and the application is provisioned on the selected at least second computing node.

2. The compliance-based application deployment method of claim 1, further comprising generating the user interface to receive manual selection of the at least one computing node.

3. The compliance-based application deployment method of claim 2, further comprising inhibiting the manual selection of a non-compliant computing node.

4. The compliance-based application deployment method of claim 2, further comprising allowing the manual selection of a non-compliant computing node, and generating an alert message.

5. The compliance-based application deployment method of claim 1, further comprising:
monitoring the compliance level on an ongoing basis; and
generating an alert message when the at least one computing node becomes non-compliant with the specified compliance level.

6. The compliance-based application deployment method of claim 1, further comprising provisioning the application on the at least one computing node using an operations management application.

7. The compliance-based application deployment method of claim 1, further comprising receiving at least one of a standard specified compliance level and a custom specified compliance level.

8. A compliance-based application deployment system for a cloud computing environment, the system comprising:
a computing system comprising at least one processor and at least one memory to store a service that is configured to, when executed by the at least one processor:
obtain a compliance level for each of a plurality of computing nodes configured in the a cloud computing environment;
generate a standardized compliance specification instance;
append a compliance level metadata to the standardized compliance specification instance, wherein the compliance level metadata directly includes the obtained compliance level;
generate a user interface on a display screen to receive a request to provision an application on the cloud computing environment, the request including a specified compliance level associated with the application, the request comprising an identification of a type of second application that is non-compliant with the application;
select at least one compliant computing node from among the plurality of computing nodes, the obtained compliance level for the at least one compliant computing node meeting the specified compliance level, by:
retrieving the standardized compliance specification instance and extracting the obtained compliance level from the appended metadata of the standardized compliance specification instance;
comparing the obtained compliance level to the specified compliance level associated with the application; and
selecting the at least on compliant computing node based on a determination that the obtained compliance level is not below the specified compliance level;
provision the application on the selected at least one computing node; and
monitor a configuration of the at least one computing node by a compliance detection service in communication with the at least one computing node, the compliance detection service updating the compliance level for each of the plurality of computing nodes in response to changes in the configuration of a respective computing node of the plurality of computing nodes;
wherein when an application of the specified type of second application that is non-compliant with the application is deployed to the at least one computing node based on the monitored configuration change of the at least one computing node, an at least second compliant computing node is selected from among the plurality of computing nodes and the application is provisioned on the selected at least second computing node.

9. The compliance-based application deployment system of claim 8, wherein the service is further configured to generate the user interface to receive manual selection of the at least one computing node.

10. The compliance-based application deployment system of claim 9, wherein the service is further configured to inhibit the manual selection of a non-compliant computing node.

11. The compliance-based application deployment system of claim 9, wherein the service is further configured to allow the manual selection of a non-compliant computing node, and generate an alert message.

12. The compliance-based application deployment system of claim 8, wherein the service is further configured to:
monitor the compliance level on an ongoing basis; and
generate an alert message when the computing node becomes non-compliant with the specified compliance level.

13. The compliance-based application deployment system of claim 8, wherein the service is further configured to provision the application on the at least one computing node using an operations management application.

14. The compliance-based application deployment system of claim 8, wherein the request comprises a Topology and Orchestration Specification for Cloud Applications (TOSCA) formatted message.

15. The compliance-based application deployment system of claim 8, wherein the service is further configured to receive at least one of a standard specified compliance level and a custom specified compliance level.

16. A non-transitory, computer readable medium that is encoded with instructions that, when executed by at least one processor, is operable to perform at least the following:
  obtaining a compliance level for each of a plurality of computing nodes configured in a cloud computing environment;
  generating a standardized compliance specification instance;
  appending a compliance level metadata to the standardized compliance specification instance, wherein the compliance level metadata directly includes the obtained compliance level;
  generating a user interface on a display screen to receive a request to provision an application on the cloud computing environment, the request including a specified compliance level associated with the application, the request comprising an identification of a type of second application that is non-compliant with the application;
  selecting at least one compliant computing node from among the plurality of computing nodes, the obtained compliance level for the at least one compliant computing node meeting the specified compliance level, by:
    retrieving the standardized compliance specification instance and extracting the obtained compliance level from the appended metadata of the standardized compliance specification instance;
    comparing the obtained compliance level to the specified compliance level associated with the application; and
    selecting the at least one compliant computing node based on a determination that the obtained compliance level is not below the specified compliance level;
  provisioning the application on the selected at least one computing node; and
  monitoring a configuration of the at least one computing node by a compliance detection service in communication with the at least one computing node, the compliance detection service updating the compliance level for each of the plurality of computing nodes in response to changes in the configuration of a respective computing node of the plurality of computing nodes;
  wherein when an application of the specified type of second application that is non-compliant with the application is deployed to the at least one computing node based on the monitored configuration change of the at least one computing node, an at least second compliant computing node is selected from among the plurality of computing nodes and the application is provisioned on the selected at least second computing node.

17. The non-transitory, computer readable medium that is encoded with instructions of claim 16, further operable to perform generating the user interface to receive manual selection of the at least one computing node.

18. The non-transitory, computer readable medium that is encoded with instructions of claim 16, further operable to perform:
  monitoring the compliance level at an ongoing basis; and
  generating an alert message when the computing node becomes non-compliant with the specified compliance level.

* * * * *